(12) United States Patent
Malik et al.

(10) Patent No.: US 12,452,695 B2
(45) Date of Patent: Oct. 21, 2025

(54) MITIGATION OF RECEIVER SATURATION VIA BEAM ADJUSTMENT

(71) Applicant: QUALCOMM Incorporated, San Diego, CA (US)

(72) Inventors: Rahul Malik, San Diego, CA (US); Farhad Meshkati, San Diego, CA (US); Ting Kong, San Diego, CA (US); Raghu Narayan Challa, San Diego, CA (US); Jong Hyeon Park, San Jose, CA (US); Junsheng Han, Los Altos Hills, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/069,940

(22) Filed: Dec. 21, 2022

(65) Prior Publication Data

US 2023/0308894 A1 Sep. 28, 2023

Related U.S. Application Data

(60) Provisional application No. 63/323,494, filed on Mar. 24, 2022.

(51) Int. Cl.
*H04W 24/08* (2009.01)
*H04B 7/06* (2006.01)
*H04W 16/28* (2009.01)
*H04W 52/24* (2009.01)
*H04W 52/38* (2009.01)

(52) U.S. Cl.
CPC .......... *H04W 16/28* (2013.01); *H04B 7/0632* (2013.01); *H04W 24/08* (2013.01); *H04W 52/24* (2013.01); *H04W 52/38* (2013.01)

(58) Field of Classification Search
None
See application file for complete search history.

(56) References Cited

U.S. PATENT DOCUMENTS

| 2010/0182903 | A1* | 7/2010 | Palanki | H04L 5/0007 370/252 |
| 2010/0234061 | A1 | 9/2010 | Khandekar et al. | |
| 2011/0013560 | A1* | 1/2011 | Zhang | H04B 1/1027 370/328 |

(Continued)

FOREIGN PATENT DOCUMENTS

| WO | 2020260933 A1 | 12/2020 |
| WO | 2021014197 A1 | 1/2021 |

OTHER PUBLICATIONS

Partial International Search Report—PCT/US2023/064184—ISA/EPO—May 23, 2023.

(Continued)

*Primary Examiner* — Peter P Chau
(74) *Attorney, Agent, or Firm* — Dang M. Vo; Patterson & Sheridan LLP

(57) ABSTRACT

Certain aspects of the present disclosure provide techniques wireless communication at a first wireless node generally including communicating with a second wireless device using a first beam, detecting at least one condition indicative of receiver saturation at the first wireless device or the second wireless device, and taking at least one action designed to mitigate the receiver saturation after detecting the at least one condition.

20 Claims, 11 Drawing Sheets

(56) References Cited

U.S. PATENT DOCUMENTS

2017/0303274 A1* 10/2017 He .................... H04W 72/23
2021/0328847 A1   10/2021 Zach et al.
2021/0377092 A1   12/2021 Zach et al.

OTHER PUBLICATIONS

International Search Report and Written Opinion—PCT/US2023/064184—ISA/EPO—Jun. 30, 2023.

* cited by examiner

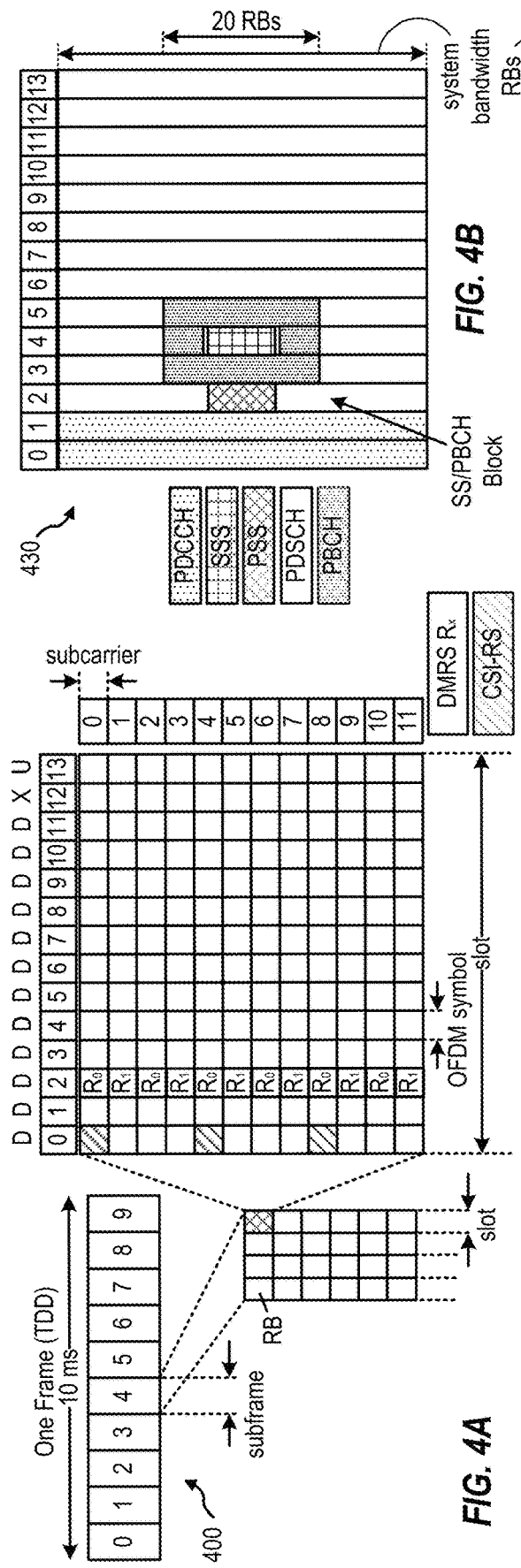
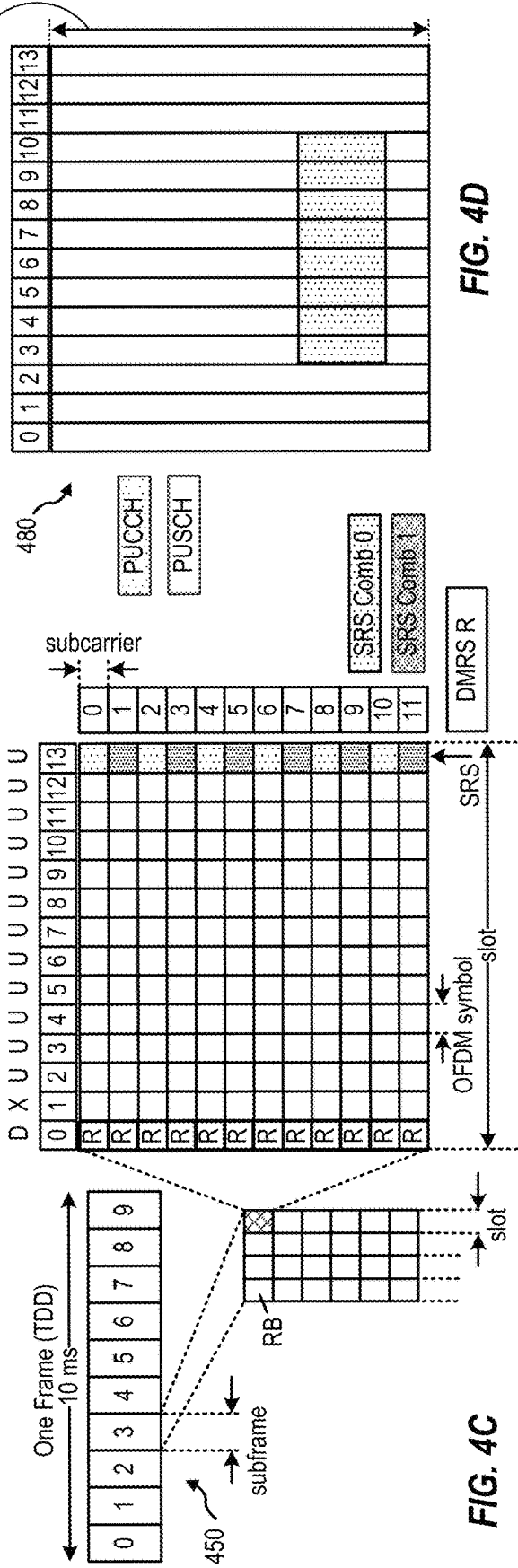

MITIGATION OF RECEIVER SATURATION VIA BEAM ADJUSTMENT

CROSS-REFERENCE TO RELATED APPLICATION(S)

This application claims benefit of and priority to U.S. Provisional Patent Application No. 63/323,494, filed Mar. 24, 2022, herein incorporated by reference in its entirety as if fully set forth below and for all application purposes.

BACKGROUND

Field of the Disclosure

Aspects of the present disclosure relate to wireless communications, and more particularly, to techniques for mitigating the impact of receiver saturation at a wireless device.

Description of Related Art

Wireless communications systems are widely deployed to provide various telecommunications services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect of the present disclosure provides a method for wireless communication by a first wireless node. The method generally includes communicating with a second wireless device using a first beam, detecting at least one condition indicative of receiver saturation at the first wireless device or the second wireless device, and taking at least one action designed to mitigate the receiver saturation after detecting the at least one condition.

One aspect of the present disclosure provides a method for wireless communication by a first wireless node. The method generally includes communicating with a second wireless device using a first-beam, obtaining, from the second device, an indication for the first wireless device to lower its transmission power level, determining that the lower transmission power level results in a degraded transmit error vector magnitude (EVM), and taking action, based on the determination, to mitigate degradation of the transmit EVM.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for wireless communications that enable mitigation of receiver saturation via beam adjustment.

Figure 6:
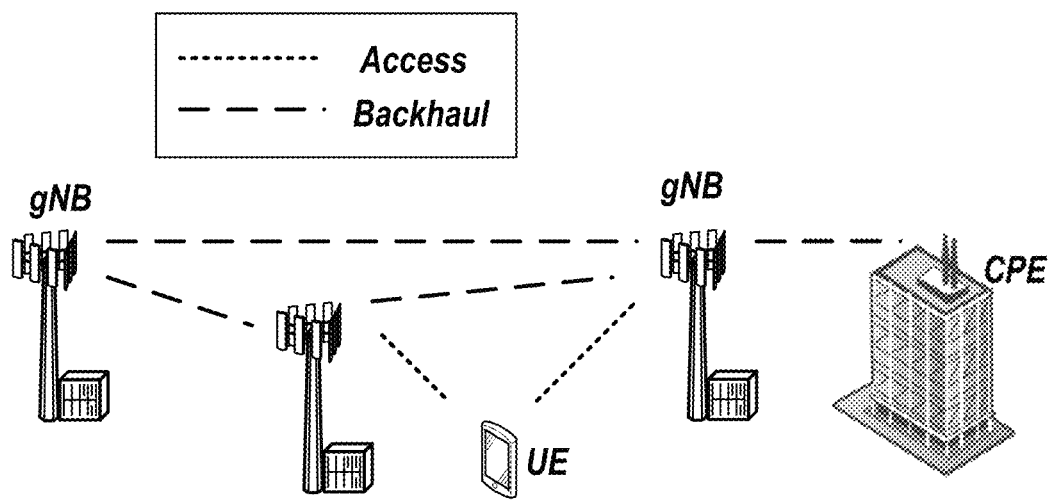
FIG. 6 illustrates an example wireless communication system, in which aspects of the present disclosure may be practiced.

Advanced Networks (e.g., 5G+, such as 6G), such as the example network 600 shown in FIG. 6, may rely on various types of nodes, such as gNBs (or other types of network entities) and customer premises equipment (CPE) to help meet demanding data requirements. As illustrated, such nodes may provide backhaul support between network entities, such as other gNBs (or relays), as well as access support to user equipments (UEs).

In such networks, if a UE or CPE (or any type of fixed wireless access receiver) is deployed too close to the gNB, there can be performance degradation on the downlink, uplink, or both, due to receiver saturation at the UE/CPE or gNB, such as saturation at the radio frequency (RF) modules of such nodes. This issue may be more severe when multiple antenna elements are used at the UE/CPE and/or gNBs to create narrow beams (to increase gain) for improved link budget in NR millimeter wave (mmW) systems. Performance degradation can be in the form of reduction in signal to noise ratio (SNR), although received signal level may be high.

Aspects of the present disclosure provide techniques that may help mitigate this type of saturation problem by taking action when a condition indicative of receiver saturation is detected. As an example, as will be described in greater detail below, a wireless node (e.g., a UE/CPE and/or gNB) can choose a beam that is not in the best direction in terms of received signal level (e.g., by taking into account the SNR metric to avoid or reduce the receiver saturation). This action may be taken by a UE/CPE, by a gNB, or both by adjusting a receive (Rx) beam, a transmit (Tx) beam, or both.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
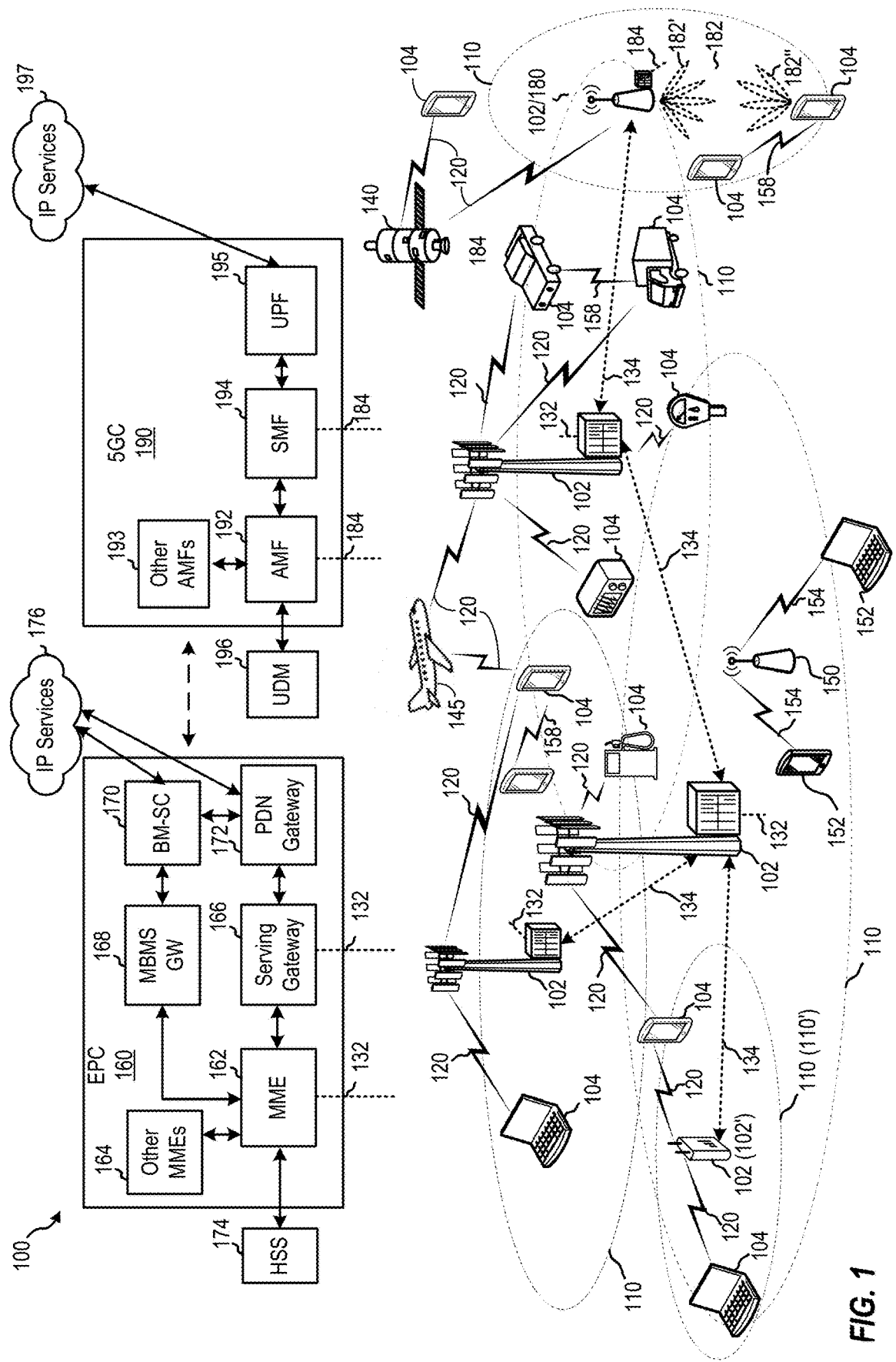
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
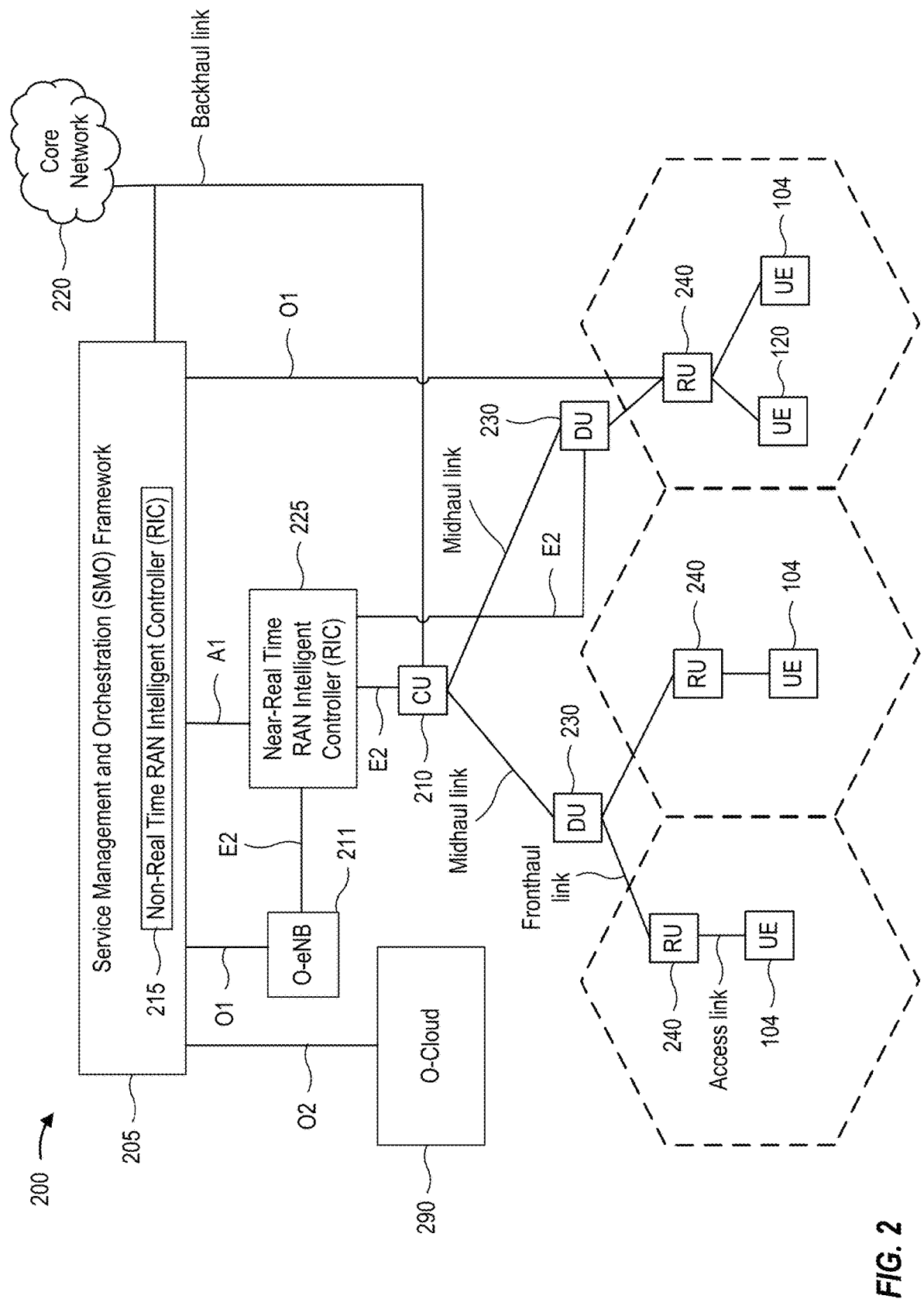
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT MC 215 from non-network data sources or from network functions. In some examples, the Non-RT MC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
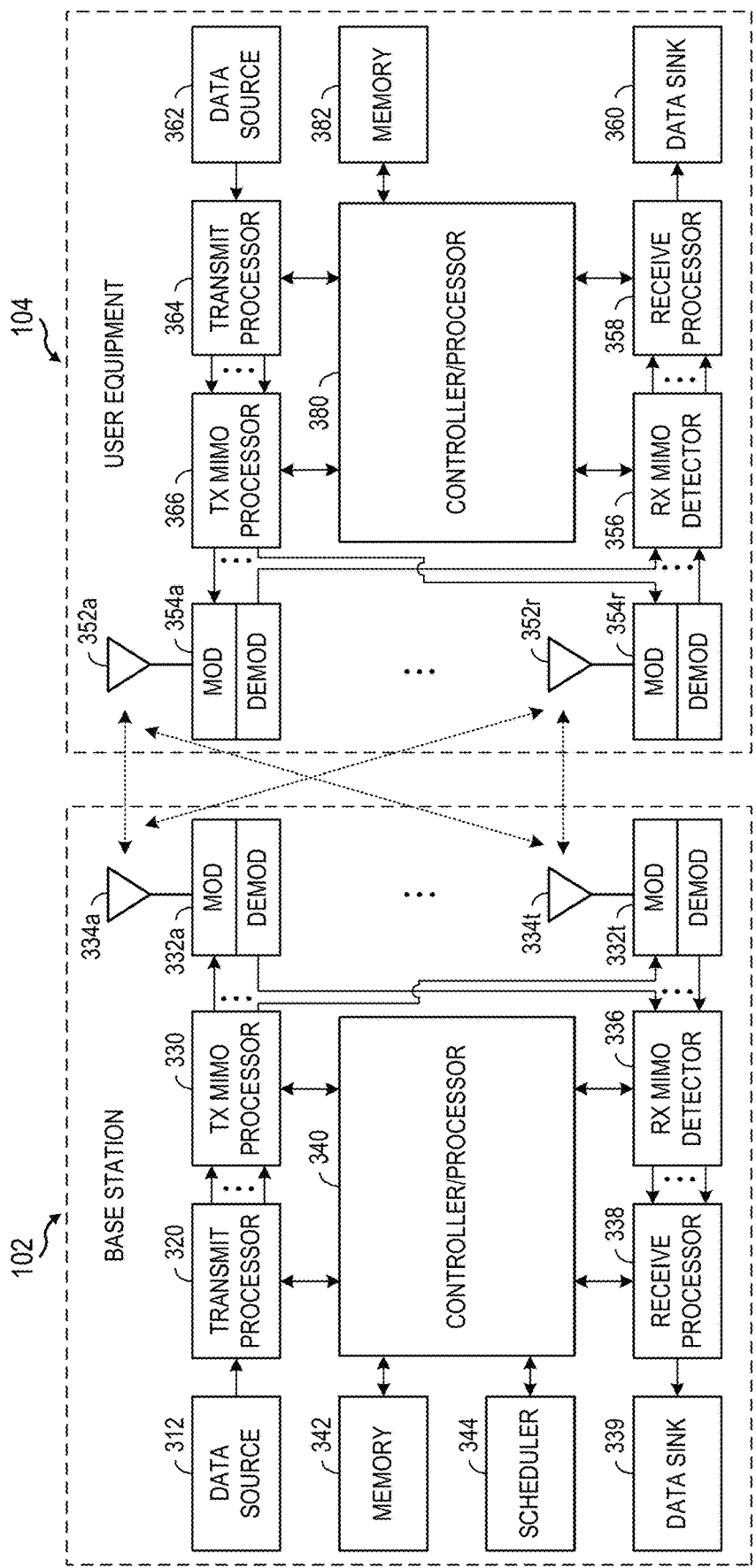
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu \times 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Beam Management Procedures

Figure 5:
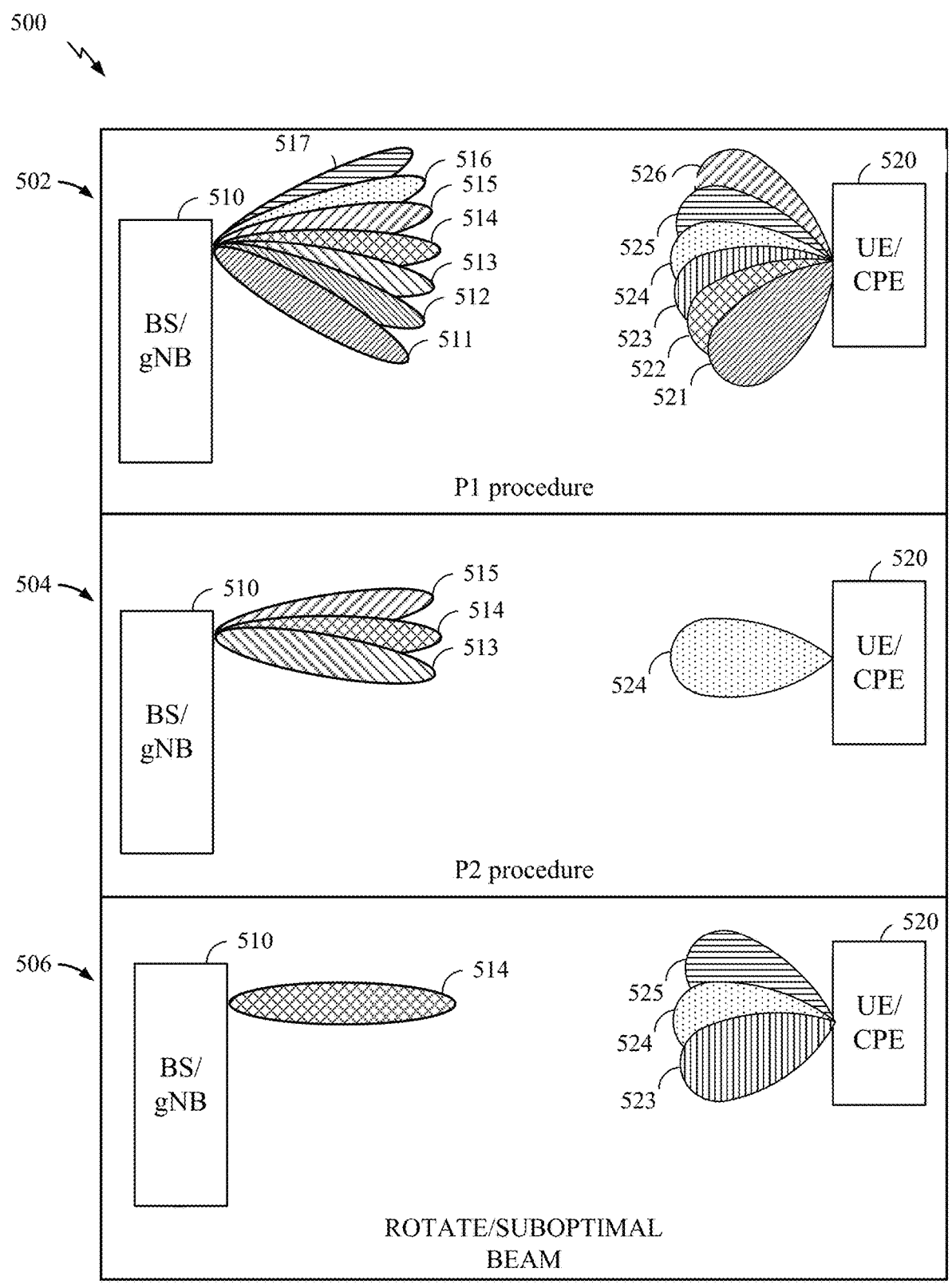
FIG. 5 illustrates example beam management procedures, in accordance with certain aspects of the present disclosure.

FIG. 5 illustrates example beam management procedures, in accordance with certain aspects of the present disclosure. As shown in FIG. 5, beam management procedures may be divided into three phases: P1 procedure, P2 procedure, and P3 procedure. In 5G New Radio (NR), the beam management procedure for determining beam pair links (BPLs) may be referred to as a P1 procedure. A base station (BS) 510 (e.g., such as the BS 102 in FIG. 1 and/or the eNB 211 in FIG. 2) may send a measurement request to a user equipment (UE) 520 (e.g., such as the UE 104 in FIG. 1 and/or FIG. 2) and may subsequently transmit one or more signals (sometimes referred to as the "P1-signal") to the UE 520 for measurement. In the P1 procedure 502, the BS 510 may transmit the signal with beam forming in a different spatial direction (corresponding to a transmit beam 511, 512, . . . , 517) in each symbol, such that several (e.g., most or all) relevant spatial locations of the cell of the BS 510 are reached. In this manner, the BS 510 may transmit the signal using different transmit beams over time in different directions. In some examples, a synchronization signal block (SSB) may be used as the P1-signal. In some examples, a channel state information reference signal (CSI-RS), a demodulation reference signal (DMRS), or another downlink (DL) signal may be used as the P1-signal.

In the P1 procedure 502, to successfully receive at least a symbol of the P1-signal, the UE 520 may find (e.g., determine/select) an appropriate receive beam (521, 522, ..., 526). Signals (e.g., SSBs) from multiple BSs may be measured simultaneously for a given signal index (e.g., SSB index) corresponding to a given time period. The UE 520 may utilize a different receive beam during each occurrence (e.g., each symbol) of the P1-signal. Once the UE 520 succeeds in receiving a symbol of the P1-signal, the UE 520 and BS 510 may have discovered a BPL (i.e., the UE receive (RX) beam used to receive the P1-signal in the symbol and the BS transmit (TX) beam used to transmit the P1-signal in the symbol). In some cases, the UE 520 may not search all of its possible UE RX beams until it finds the best UE RX beam, since this causes additional delay. Instead, the UE 520 may select a RX beam once the RX beam is "good enough", for example, having a quality (e.g., signal to noise ratio (SNR) or signal to interference and noise ratio (SINR)) that satisfies a threshold (e.g., predefined threshold). The UE 520 may not know which beam the BS 510 used to transmit the P1-signal in a symbol; however, the UE 520 may report to the BS 510 the time at which it observed the signal. For example, the UE 520 may report the symbol index in which the P1-signal was successfully received to the BS 510. The BS 510 may receive this report and determine which BS TX beam the BS 510 used at the indicated time. In some examples, UE 520 may measure signal quality of the P1-signal, such as reference signal receive power (RSRP) or another signal quality parameter (e.g., SNR, channel flatness, etc.). The UE 520 may report the measured signal quality (e.g., RSRP) to the BS 510 together with the symbol index. In some cases, the UE 520 may report multiple symbol indices to the BS 510, corresponding to multiple BS TX beams.

As a part of a beam management procedure, the BPL used between a UE 520 and BS 110 may be refined/changed. The BPL may be refined periodically to adapt to changing channel conditions, for example, due to movement of the UE 520 or other objects, fading due to Doppler spread, etc. The UE 520 may monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

As shown in FIG. 5, for the P2 procedure 504, the BS 510 may transmit symbols of a signal with different BS-beams (e.g., TX beams 513, 514, 515) that may be spatially close to the BS-beam of the current BPL. For example, the BS 510 may transmit the signal in different symbols using neighboring TX beams (e.g., beam sweeps) around the TX beam of the current BPL. As shown in FIG. 5, the TX beams used by the BS 510 for the P2 procedure 504 may be different from the TX beams used by the BS 510 for the P1 procedure 502. For example, the TX beams used by the BS 510 for the P2 procedure 504 may be spaced closer together and/or may be more focused (e.g., narrower) than the TX beams used by the BS 510 for the P1 procedure. During the P2 procedure 504, the UE 520 may keep its RX beam (e.g., RX beam 524) constant. The UE 520 may measure the signal quality (e.g., RSRP) of the signal in the different symbols and indicate the symbol in which the highest signal quality was measured. Based on the indication, the BS 510 may determine the strongest (e.g., best, or associated with the highest signal quality) TX beam (i.e., the TX beam used in the indicated symbol). The BPL may be refined accordingly to use the indicated TX beam.

As shown in FIG. 5, for the P3 procedure 506, the BS 510 may maintain a constant TX beam (e.g., the TX beam of the current BPL) and transmit symbols of a signal using the constant TX beam (e.g., TX beam 514). During the P3 procedure 506, the UE 520 may scan the signal using different RX beams (e.g., RX beams 523, 524, 525) during different symbols. For example, the UE 520 may perform a sweep using neighboring RX beams to the RX beam in the current BPL (i.e., the BPL being refined). The UE 520 may measure the signal quality (e.g., RSRP) of the signal for each RX beam and identify the strongest UE RX beam. The UE 520 may use the identified RX beam for the BPL. The UE 520 may report the signal quality to the BS 510.

Aspects Related to Mitigation of Receiver Saturation Via Beam Adjustment

Aspects of the present disclosure provide apparatuses, methods, processing systems, and computer-readable mediums for wireless communications that enable mitigation of receiver saturation via beam adjustment. Aspects of the present disclosure also provide apparatuses, methods, processing systems, and computer-readable mediums for wireless communications that enable a wireless device to achieve a target transmission power level, while preserving a target error vector magnitude (EVM).

As described above, if a UE or CPE (or any type of fixed wireless access receiver) is deployed too close to another entity (e.g., a gNB), there can be performance degradation on the downlink, uplink, or both, due to receiver saturation. This issue may be more severe when multiple antenna elements are used, such as when phased antenna arrays are used (at the UE/CPE and/or gNBs) to create narrow beams (to increase gain) for improved link budget in NR millimeter wave (mmW) systems. Performance degradation can be in the form of reduction in signal to noise ratio (SNR), although received signal level may be high.

The degradation may be the result of limitations in certain components in the radio frequency (RF) processing chain, such as an automated gain control (AGC) component. In such cases, the AGC is intended to optimize the signal level as seen at the analog to digital converter (ADC) to maximize the dynamic range and the utilization of all the digital bits that you have downstream of that ADC. Unfortunately, when a signal is too strong, the ADC may be effectively saturated, meaning a loss of fidelity in the digital processing chain, due to a clipped signal.

Aspects of the present disclosure provide techniques that may help mitigate this type of saturation problem by taking action when a condition indicative of receiver saturation is detected. As an example, as will be described in greater detail below, a wireless node (e.g., a UE/CPE and/or gNB) can choose a beam that is not in the best direction in terms of received signal level (e.g., by taking into account the SNR metric to avoid or reduce the receiver saturation). This action may be taken by a UE/CPE, by a gNB, or both by adjusting a receive (Rx) beam, a transmit (Tx) beam, or both.

For example, a CPE may have a relatively large number of antenna elements (e.g., 32) and some CPE receive beams may be created using all the (32) antenna elements. In such cases, if the CPE is deployed too close to the gNB and, hence, receiver saturation occurs at the CPE, instead of picking the best receive beam direction, the CPE can pick a different beam which has a smaller Rx gain in the direction of the strongest signal from gNB. This way the effective received signal level may be reduced, which may help prevent or reduce receiver saturation and improve SNR.

Figure 7A:
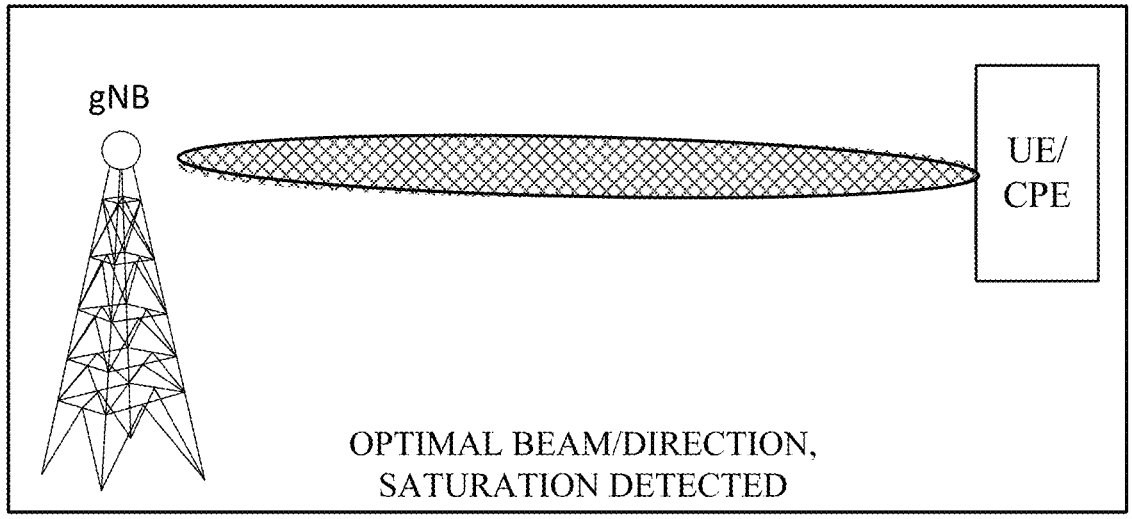
FIGS. 7A and 7B illustrate examples of how a beam direction may be altered to mitigate receiver saturation, in accordance with certain aspects of the present disclosure.
Figure 7B:
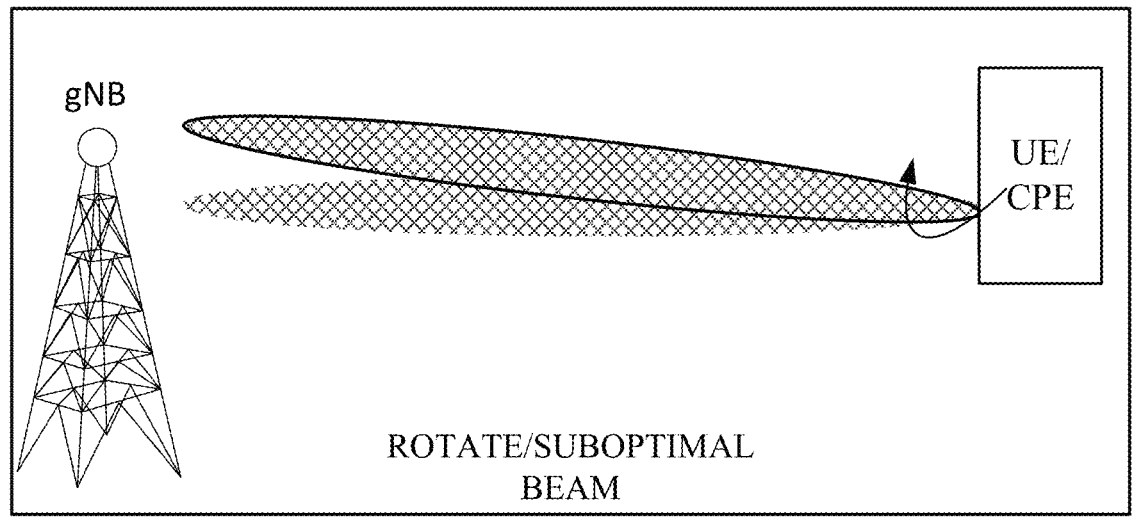

An example of this is shown in FIG. 7A and FIG. 7B. The example assumes, in FIG. 7A, that an optimal beam is selected and that beam results in receiver saturation (e.g., at the UE/CPE or gNB). As illustrated in FIG. 7B, a less than optimal beam may be selected, which may reduce the effective received signal level, which may help prevent or reduce receiver saturation and improve SNR.

The various beams involved in the techniques described herein (e.g., optimal and sub-optimal beams) may be determined using any suitable procedures. For example, such beams may be selected using a beam management procedure, such as one of the beam management procedures (P1, P2, and P3) shown in FIGS. 5A-5C. In some cases, such procedures may be performed to identify an optimal beam and one or more sub-optimal beams may also be identified.

In some cases, the decision of which beam to pick may be based on combination of received signal level and SNR metrics. This beam selection can be done autonomously by the UE/CPE, by the gNB, or in a coordinated fashion between the UE/CPE and gNB.

In some cases, the gNB may use reference signal received power (RSRP) and reference signal received quality (RSRQ), obtained via measurement reports from the UE, to detect receiver saturation on the downlink. For example, receiver saturation may be indicated on the downlink if RSRP is high, but RSRQ is low. In such cases, the gNB may adjust its transmit beam to mitigate the receiver saturation at the UE/CPE.

Similarly, in some cases, the UE/CPE may use power control commands received at the gNB as an indication of saturation at the gNB to adjust its transmit beam.

In some cases, rather than adjust a receive or transmit beam (direction), another solution is to change the beam level (e.g., to reduce the number of antenna elements used for creating the beam) when receiver saturation is detected. This approach may be implemented in devices that utilize a phased antenna array. In some cases, this approach may be used to maintain transmit or receive (Tx/Rx) quality thresholds.

In some cases, systems may utilize some type of reflectors (e.g., parabolic reflectors) to enhance the gain of a CPE, while using fewer antenna elements and/or smaller antenna modules with a static beam to illuminate the reflector and a motorized assembly to reposition or rotate the beam. The use of fewer elements/smaller modules reduces/eliminates the ability to use a reduced beam level. For example, with a single element beam with a high gain reflector there is no option to reduce the beam level. Thus the only solution is to alter the beam direction, by (physically) changing the direction of the antenna/reflector assembly.

Figure 8A:
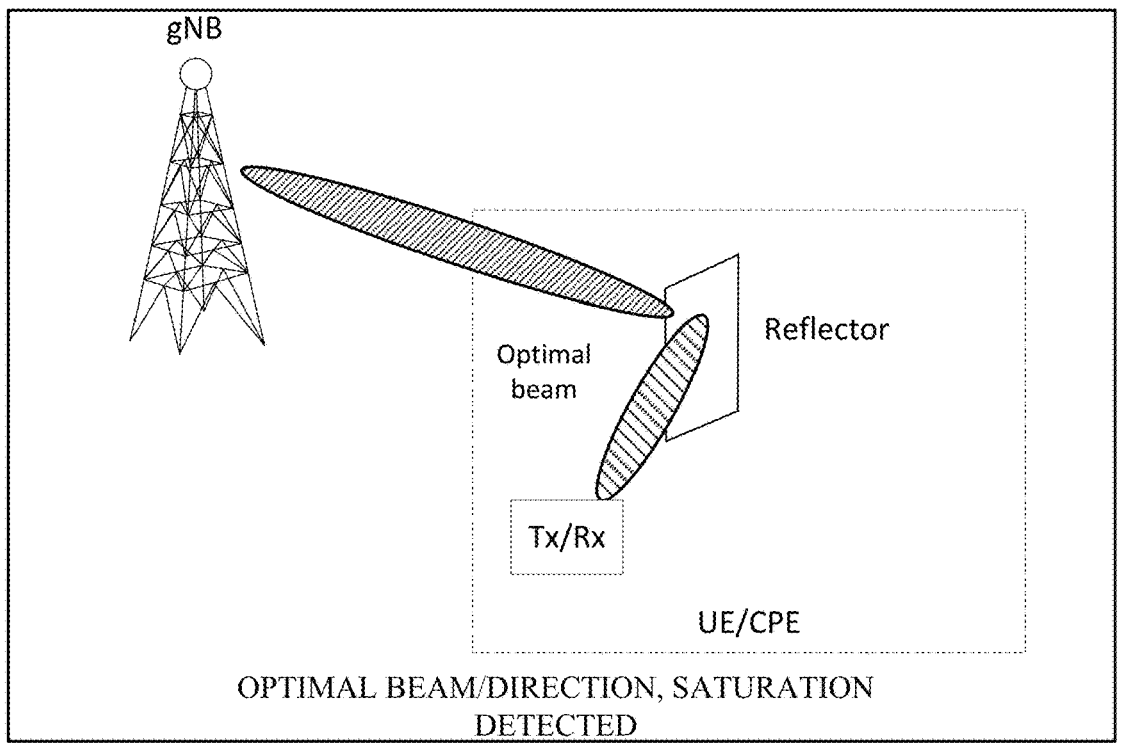
FIGS. 8A and 8B illustrate examples of how a beam direction may be altered to mitigate receiver saturation, in accordance with certain aspects of the present disclosure.
Figure 8B:
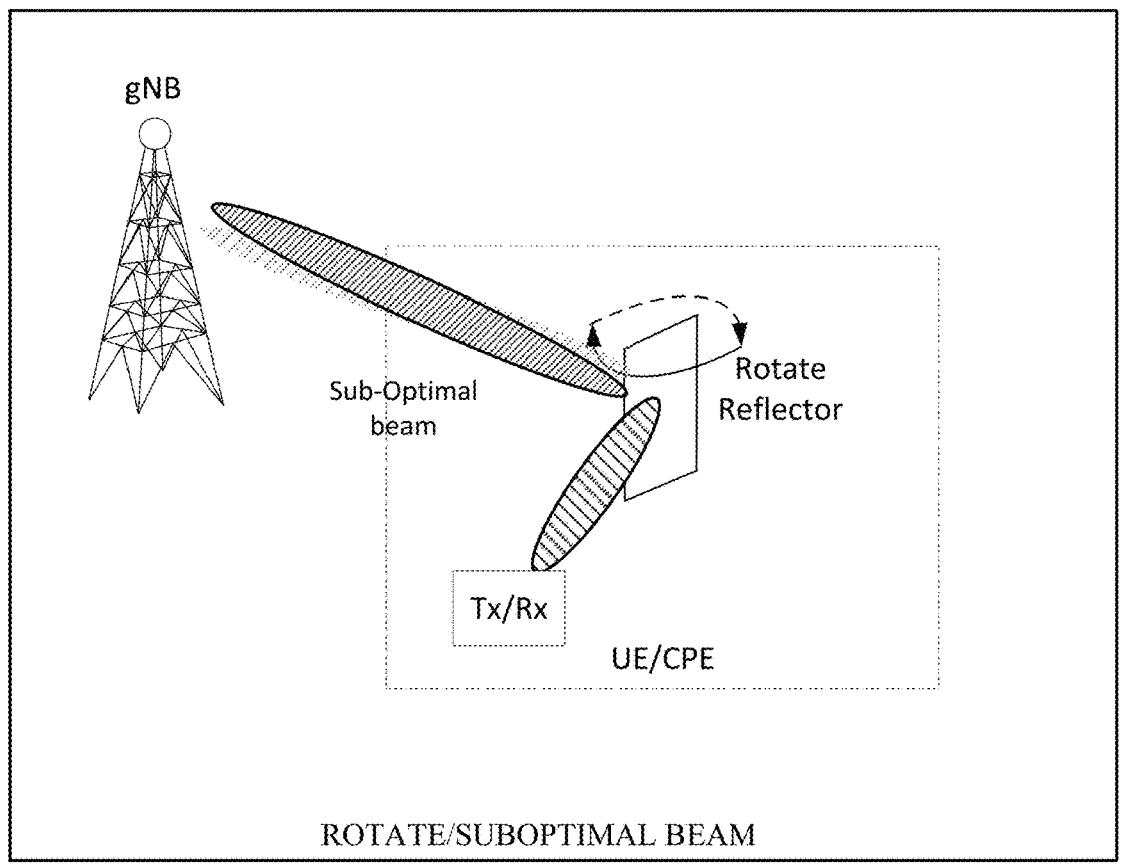

An example of how a beam may be adjusted by changing a reflector or reorienting an antenna assembly is shown in FIG. 8A and FIG. 8B. The example assumes, in FIG. 8A, that an optimal beam is selected, via a reflector, and that beam results in receiver saturation (e.g., at the UE/CPE or gNB). As illustrated in FIG. 8B, a less than optimal beam may be selected, for example by rotating the reflector, which may reduce the effective received signal level, which may help prevent or reduce receiver saturation and improve SNR.

In some cases, the orientation of an antenna assembly or reflector may be adjusted via one or more motors. For example, such motors may be controlled by issuing commands (e.g., via an application programming interface-API) to rotate, change an azimuth, pitch, or elevation. As an alternative or in addition, some amount of beam adjustment may be made via a phased antenna array.

In some cases, a similar beam adjustment (as described above) may be performed in order to try and maintain one or more transmit quality metrics. For example, a first wireless device (e.g., a UE/CPE/gNB) may communicate with a second wireless device using a firstbeam. The first wireless node may then obtain an indication, from the second wireless node, that the first wireless node is to lower its Tx power level (e.g., using Tx power control commands or otherwise). The first wireless node may determine that the requested Tx power results in degradation, for example, exhibited as an increase of transmit error vector magnitude (Tx EVM). In such cases, the first wireless device may use a combination of beam level adjustment and/or other type of transmit gain adjustment to achieve a target power level, while preserving EVM.

Example Operations

Figure 9:
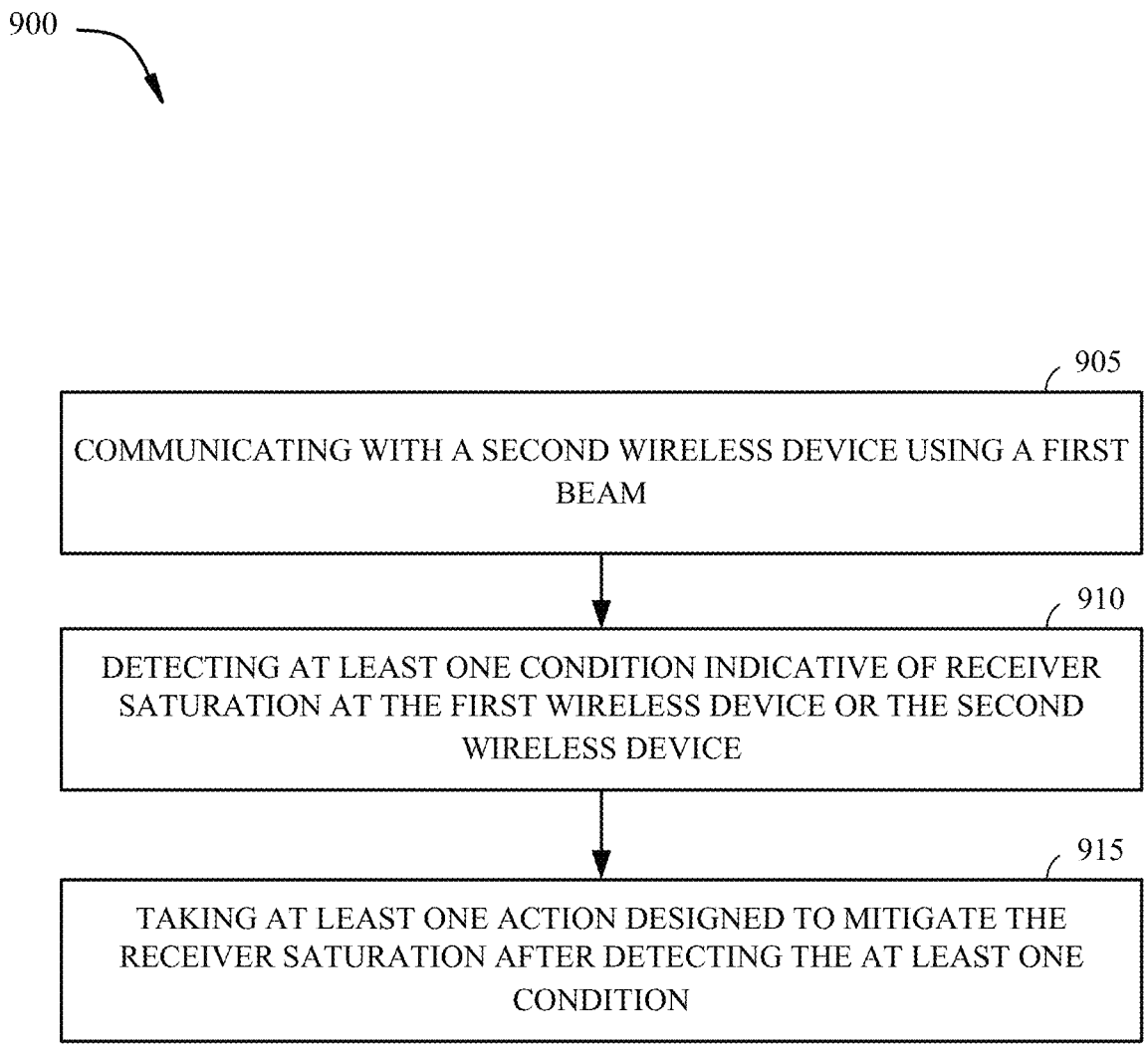
FIG. 9 illustrates example operations for wireless communication, in accordance with certain aspects of the present disclosure.

FIG. 9 is a flow diagram illustrating example operations 900 for wireless communications, in accordance with certain aspects of the present disclosure. Operations 900 may be performed, for example, by a first wireless node, such as a UE, CPE, or a network node, such as a gNB or RU/DU/CU of a disaggregated base station.

Operations 900 begin, at 905, by communicating with a second wireless device using a first beam. At 910, the first wireless node detects at least one condition indicative of receiver saturation at the first wireless device or the second wireless device. At 915, the first wireless node takes at least one action designed to mitigate the receiver saturation after detecting the at least one condition.

Figure 10:
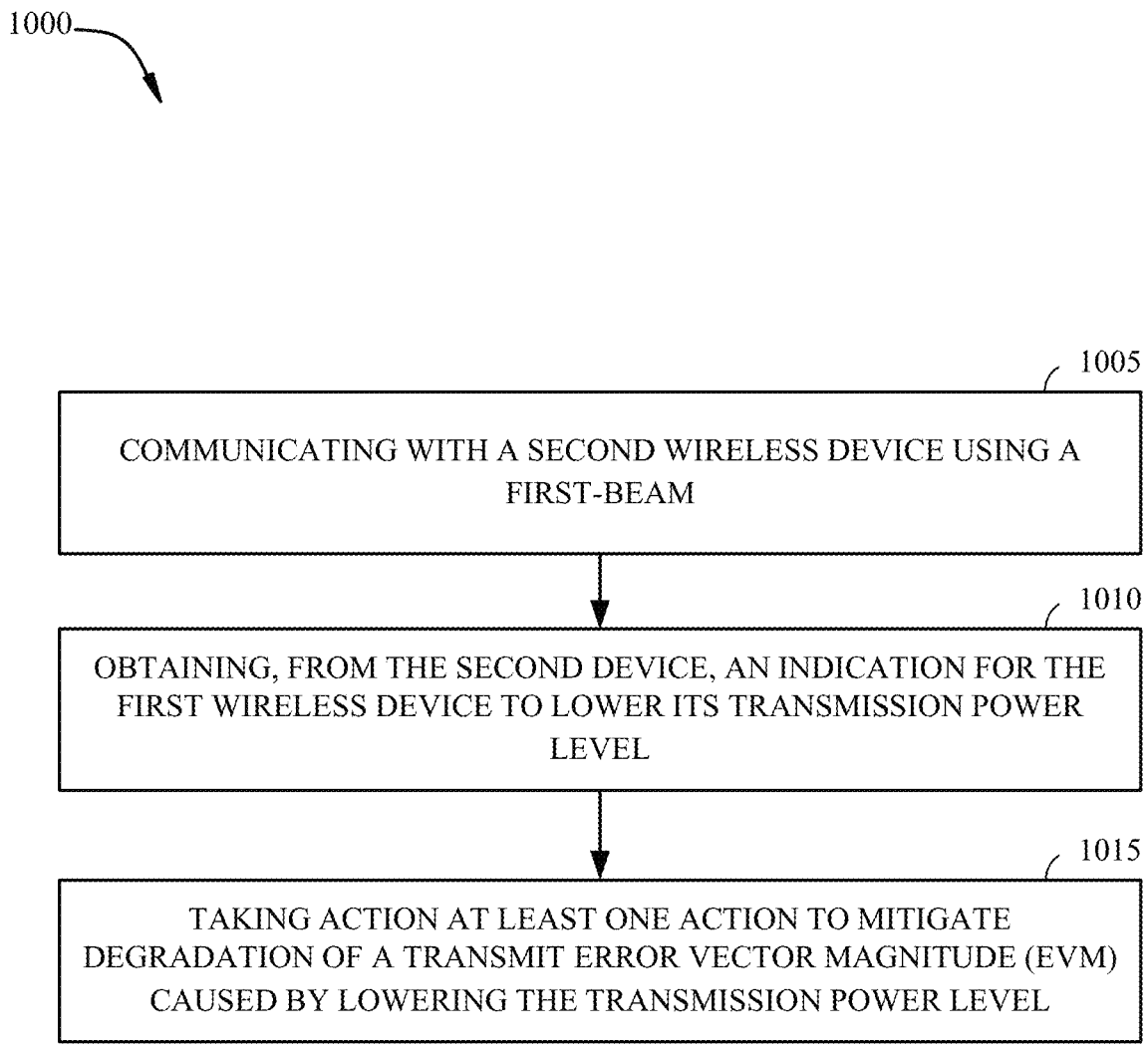
FIG. 10 illustrates example operations for wireless communication, in accordance with certain aspects of the present disclosure.

FIG. 10 is a flow diagram illustrating example operations 1000 for wireless communications, in accordance with certain aspects of the present disclosure. Operations 1000 may be performed, for example, by a first wireless node, such as a UE, CPE, or a network node, such as a gNB or RU/DU/CU of a disaggregated base station.

Operations 1000 begin, at 1005, by communicating with a second wireless device using a first-beam. At 1010, the first wireless node obtains, from the second device, an indication for the first wireless device to lower its transmission power level. At 1015, the first wireless node takes action at least one action to mitigate an increase of a transmit error vector magnitude (EVM) caused by lowering the transmission power level.

Example Device

Figure 11:
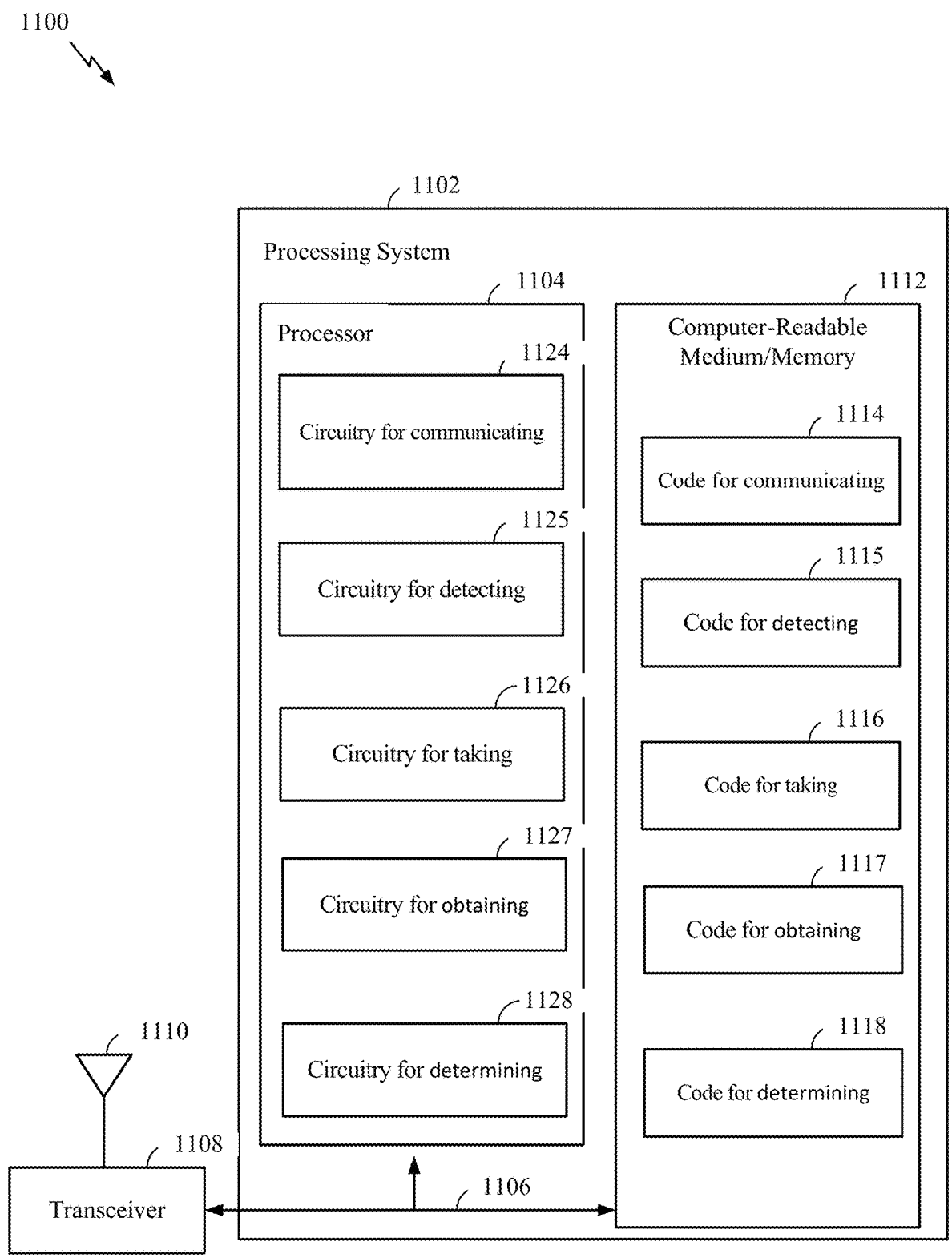
FIG. 11 depict devices with example components capable of performing techniques performed herein.

FIG. 11 illustrates a communications device 1100 that may include various components (such as corresponding to means-plus-function components) operable, configured, or adapted to perform operations for the techniques disclosed herein, such as the operations illustrated in FIGS. 9-10.

Communications device 1100 includes a processing system 1102 coupled to a transceiver 1108 (such as a transmitter or a receiver). Transceiver 1108 is configured to transmit and receive signals for the communications device 1100 via an antenna 1110, such as the various signals as described herein. Processing system 1102 may be configured to perform processing functions for the communications device 1100, including processing signals received or to be transmitted by the communications device 1100.

Processing system 1102 includes a processor 1104 coupled to a computer-readable medium/memory 1112 via a bus 1106. In certain aspects, computer-readable medium/ memory 1112 is configured to store instructions (such as computer-executable code) that when executed by processor 1104, cause processor 1104 to perform the operations illustrated in FIGS. 9-10, or other operations for performing the various techniques discussed herein.

In certain aspects, computer-readable medium/memory 1112 stores code 1114 (such as an example of means for) for communicating, code 1115 (such as an example of means for) for detecting, code 1116 (such as an example of means for) for taking, code 1117 (such as an example of means for) for obtaining, and code 1118 (such as an example of means for) for determining.

In certain aspects, processor 1104 has circuitry configured to implement the code stored in the computer-readable medium/memory 1112. Processor 1104 includes circuitry 1124 (such as an example of means for) for communicating, circuitry 1125 (such as an example of means for) for detecting, circuitry 1126 (such as an example of means for) for taking, circuitry 1127 (such as an example of means for) for obtaining, and code 1128 (such as an example of means for) for determining.

Transceiver 1108 may provide a means for receiving information such as packets, user data, or control information associated with various information channels (such as control channels, data channels, etc.). Information may be passed on to other components of the device 1100. Transceiver 1108 may be an example of aspects of the transceiver 254 described with reference to FIG. 2. Antenna 1110 may correspond to a single antenna or a set of antennas. Transceiver 1108 may provide means for transmitting signals generated by other components of the device 1100. In some aspects, means for communicating, means for detecting, means for taking action, means for changing, menas for obtaining and/or means for adjusting may include one or more of the processors illustrated in FIG. 3.

Example Aspects

Implementation examples are described in the following numbered aspects:

Aspect 1: A method for wireless communication at a first wireless device, comprising communicating with a second wireless device using a first beam; detecting at least one condition indicative of receiver saturation at the first wireless device or the second wireless device; and taking at least one action designed to mitigate the receiver saturation after detecting the at least one condition.

Aspect 2: The method of Aspect 1, wherein at least one of the first wireless device or the second wireless device comprises at least one of a user equipment (UE) or a customer premises equipment (CPE).

Aspect 3: The method of Aspect 1, wherein at least one of the first wireless device or the second wireless device comprises a network node.

Aspect 4: The method of Aspect 1, wherein the detection of the at least one condition comprises comparing one or more reference signal received power (RSRP) measurements to one or more reference signal received quality (RSRQ) measurements.

Aspect 5: The method of Aspect 4, wherein the RSRP measurements and RSRQ measurements are received in measurement reports from the second wireless device; and the at least one action comprises adjusting a transmit beam of the first wireless device to mitigate the receiver saturation at the second wireless device.

Aspect 6: The method of Aspect 1, wherein the detection of the at least one condition comprises receiving one or more transmit power commands (TPCs) that indicate the receiver saturation at the second wireless device; and the at least one action comprises adjusting a transmit beam of the first wireless device to mitigate receiver saturation at the second wireless device.

Aspect 7: The method of Aspect 1, wherein the at least one action comprises communicating with a second wireless device using a second beam being associated with a number of antenna elements that is less than a number of antenna elements being associated with the first beam.

Aspect 8: The method of Aspect 1, wherein the at least one action comprises: changing from communicating with the second wireless device using the first beam to communicating with the second wireless device using a second beam that has a direction different from a direction of the first beam.

Aspect 9: The method of Aspect 8, wherein changing from communicating with the second wireless device using the first beam to communicating with the second wireless device using the second beam comprises changing a beam direction by reorienting an antenna assembly.

Aspect 10: The method of Aspect 8, wherein changing from communicating with the second wireless device using the first beam to communicating with the second wireless device using the second beam comprises changing a direction of a reflector assembly.

Aspect 11: A method for wireless communications at a first wireless device, comprising communicating with a second wireless device using a first beam; obtaining, from the second wireless device, an indication for the first wireless device to lower transmission power level; and taking at least one action at least one action to mitigate degradation of a transmit error vector magnitude (EVM) caused by lowering the transmission power level.

Aspect 12: The method of Aspect 11, wherein obtaining the indication comprises obtaining one or more transmission power control (TPC) commands.

Aspect 13: The method of Aspect 11, wherein the at least one action comprises at least one of: adjusting a beam level or adjusting a transmit gain to achieve a target power level, while preserving a target EVM.

Aspect 14: The method of Aspect 13, wherein the at least one action comprises a combination of adjusting the beam level and adjusting the transmit gain.

Aspect 15: An apparatus for wireless communications, comprising: a memory comprising instructions; and one or more processors configured to execute the instructions and cause the apparatus to perform a method in accordance with any one of Aspects 1-14.

Aspect 16: An apparatus for wireless communications, comprising means for performing a method in accordance with any one of Aspects 1-14.

Aspect 17: A non-transitory computer-readable medium comprising instructions that, when executed by an apparatus, cause the apparatus to perform a method in accordance with any one of Aspects 1-14.

Clause 18: A wireless device, comprising: at least one transceiver; a memory comprising instructions; and one or more processors configured to execute the instructions and cause the wireless device to perform a method in accordance with any one of Clauses 1-10, wherein the at least one transceiver is configured to communicate with the second wireless device using the first beam.

Clause 19: A wireless device, comprising: at least one transceiver; a memory comprising instructions; and one or more processors configured to execute the instructions and cause the wireless device to perform a method in accordance with any one of Clauses 11-14, wherein the at least one transceiver is configured to receive the indication.

ADDITIONAL CONSIDERATIONS

As used herein, the term "determining" encompasses a wide variety of actions. For example, "determining" may include calculating, computing, processing, deriving, investigating, looking up (such as looking up in a table, a database or another data structure), ascertaining and the like. Also, "determining" may include receiving (such as receiving information), accessing (such as accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communications, comprising: at least one memory comprising processor-executable instructions; and one or more processors configured to execute the processor-executable instructions to cause the apparatus to:
communicate with a second wireless device using a first beam;
detect at least one condition indicative of receiver saturation at a first wireless device or the second wireless device; and
take at least one action to mitigate the receiver saturation after the detection of the at least one condition, wherein the at least one action comprises communicating with the second wireless device using a second beam being associated with a number of antenna elements that is less than a number of antenna elements being associated with the first beam.

2. The apparatus of claim 1, wherein at least one of the first wireless device or the second wireless device comprises at least one of a user equipment (UE) or a customer premises equipment (CPE).

3. The apparatus of claim 1, wherein at least one of the first wireless device or the second wireless device comprises a network node.

4. The apparatus of claim 1, wherein the detection of the at least one condition comprises:
comparing one or more reference signal received power (RSRP) measurements to one or more reference signal received quality (RSRQ) measurements.

5. The apparatus of claim 4, wherein at least one of:
the one or more processors are further configured to cause the apparatus to obtain the one or more RSRP measurements and the one or more RSRQ measurements via measurement reports from the second wireless device; or
the at least one action further comprises adjusting a transmit beam of the first wireless device to mitigate the receiver saturation at the second wireless device.

6. The apparatus of claim 1, wherein:
the detection of the at least one condition comprises receiving one or more transmit power commands (TPCs) that indicate the receiver saturation at the second wireless device; and
the at least one action further comprises adjusting a transmit beam of the first wireless device to mitigate the receiver saturation at the second wireless device.

7. The apparatus of claim 1, wherein the at least one action further comprises:
changing from communicating with the second wireless device using the first beam to communicating with the second wireless device using the second beam that has a direction different from a direction of the first beam.

8. The apparatus of claim 7, wherein the change changing from communicating with the second wireless device using the first beam to communicating with the second wireless device using the second beam comprises changing a beam direction by reorienting an antenna assembly.

9. The apparatus of claim 7, wherein the change from communicating with the second wireless device using the first beam to communicating with the second wireless device using the second beam comprises changing a direction of a reflector assembly.

10. The apparatus of claim 1, further comprising at least one transceiver
configured to communicate with the second wireless device, wherein the apparatus is configured as a wireless device.

11. An apparatus for wireless communications, comprising: at least one memory comprising processor-executable instructions; and one or more processors configured to execute the processor-executable instructions to cause the apparatus to:
communicate with a second wireless device using a first beam;
detect at least one condition indicative of receiver saturation at a first wireless device or the second wireless device; and
take at least one action to mitigate the receiver saturation after the detection of the at least one condition, wherein the detection of the at least one condition comprises comparing one or more reference signal received power (RSRP) measurements to one or more reference signal received quality (RSRQ) measurements.

12. An apparatus for wireless communications, comprising: at least one memory comprising processor-executable instructions; and one or more processors configured to execute the processor-executable instructions to cause the apparatus to:
communicate with a second wireless device using a first beam;
detect at least one condition indicative of receiver saturation at a first wireless device or the second wireless device; and
take at least one action to mitigate the receiver saturation after the detection of the at least one condition, wherein:
the detection of the at least one condition comprises receiving one or more transmit power commands (TPCs) that indicate the receiver saturation at the second wireless device; and
the at least one action comprises adjusting a transmit beam of the first wireless device to mitigate the receiver saturation at the second wireless device.

13. An apparatus for wireless communications, comprising: at least one memory comprising processor-executable instructions; and one or more processors configured to execute the processor-executable instructions to cause the apparatus to:
communicate with a second wireless device using a first beam;
detect at least one condition indicative of receiver saturation at a first wireless device or the second wireless device; and
take at least one action to mitigate the receiver saturation after the detection of the at least one condition, wherein the at least one action comprises changing from communicating with the second wireless device using the first beam to communicating with the second wireless device using a second beam that has a direction different from a direction of the first beam.

14. The apparatus of claim 13, wherein the detection of the at least one condition comprises:
comparing one or more reference signal received power (RSRP) measurements to one or more reference signal received quality (RSRQ) measurements.

15. The apparatus of claim 14, wherein at least one of:
the one or more processors are further configured to cause the apparatus to obtain the one or more RSRP measurements and the one or more RSRQ measurements via measurement reports from the second wireless device; or the at least one action further comprises adjusting a transmit beam of the first wireless device to mitigate the receiver saturation at the second wireless device.

16. The apparatus of claim 13, wherein:

the detection of the at least one condition comprises receiving one or more transmit power commands (TPCs) that indicate the receiver saturation at the second wireless device; and the at least one action further comprises adjusting a transmit beam of the first wireless device to mitigate the receiver saturation at the second wireless device.

17. The apparatus of claim 13, wherein the at least one action further comprises communicating with the second wireless device using the second beam being associated with a number of antenna elements that is less than a number of antenna elements being associated with the first beam.

18. The apparatus of claim 13, wherein the change from communicating with the second wireless device using the first beam to communicating with the second wireless device using the second beam comprises changing a beam direction by reorienting an antenna assembly.

19. The apparatus of claim 13, wherein the change from communicating with the second wireless device using the first beam to communicating with the second wireless device using the second beam comprises changing a direction of a reflector assembly.

20. The apparatus of claim 13, wherein:

at least one of the first wireless device or the second wireless device comprises at least one of a user equipment (UE) or a customer premises equipment (CPE); or at least one of the first wireless device or the second wireless device comprises a network node.

* * * * *